(12) United States Patent
Jiang et al.

(10) Patent No.: US 8,926,934 B2
(45) Date of Patent: Jan. 6, 2015

(54) LASER-BASED METHOD FOR GROWING AN ARRAY OF CARBON NANOTUBES

(75) Inventors: Kai-Li Jiang, Beijing (CN); Zhuo Chen, Beijing (CN); Chun-Xiang Luo, Beijing (CN); Shou-Shan Fan, Beijing (CN)

(73) Assignees: Tsinghua University, Beijing (CN); Hon Hai Precision Industry Co., Ltd., New Taipei (CA)

( * ) Notice: Subject to any disclaimer, the term of this patent is extended or adjusted under 35 U.S.C. 154(b) by 2057 days.

(21) Appl. No.: 11/982,485

(22) Filed: Nov. 2, 2007

(65) Prior Publication Data

US 2014/0363586 A1    Dec. 11, 2014

(30) Foreign Application Priority Data

Dec. 20, 2006   (CN) .......................... 2006 1 0157701

(51) Int. Cl.
*D01C 5/00*   (2006.01)
*B01J 19/08*   (2006.01)

(52) U.S. Cl.
USPC ................ 423/447.3; 423/445 B; 977/742; 977/843

(58) Field of Classification Search
USPC ............ 423/447.3, 447.5; 977/842, 843, 844
See application file for complete search history.

(56) References Cited

U.S. PATENT DOCUMENTS

| | | |
|---|---|---|
| 2,549,298 A | 4/1951 | Donegan |
| 4,226,900 A | 10/1980 | Carlson et al. |
| 4,682,075 A | 7/1987 | Nelson et al. |
| 4,702,558 A | 10/1987 | Coles et al. |
| 5,154,945 A * | 10/1992 | Baldwin et al. ............... 427/596 |
| 5,288,558 A | 2/1994 | Nothe |
| 5,773,834 A * | 6/1998 | Yamamoto et al. ........ 250/423 F |
| 6,444,400 B1 | 9/2002 | Cloots et al. |
| 6,869,479 B2 | 3/2005 | Shafeev et al. |
| 6,917,058 B2 | 7/2005 | Niigaki et al. |
| 7,061,749 B2 * | 6/2006 | Liu et al. ....................... 361/502 |
| 7,131,537 B2 * | 11/2006 | Papadimitrakopoulos ..... 209/18 |
| 7,357,691 B2 | 4/2008 | Liu et al. |
| 7,448,931 B2 | 11/2008 | Liu et al. |
| 7,682,658 B2 | 3/2010 | Jiang et al. |

(Continued)

FOREIGN PATENT DOCUMENTS

| | | |
|---|---|---|
| JP | 2005-239494 | 9/2005 |
| JP | 2005239494 A * | 9/2005 |
| TW | 200634171 | 10/2006 |

OTHER PUBLICATIONS

Kwok et al, Growth of carbon nanotubes by open-air laser-induced chemical vapor deposition, 2005 carbon 43, pp. 437-446.*

(Continued)

*Primary Examiner* — Melvin C Mayes
*Assistant Examiner* — Stefanie Cohen
(74) *Attorney, Agent, or Firm* — Novak Druce Connolly Bove + Quigg LLP

(57) ABSTRACT

A method for growing an array of carbon nanotubes includes the steps of: (a) providing a substrate; (b) forming a catalyst film on the substrate, the catalyst film including carbonaceous material; (c) introducing a mixture of a carrier gas and a carbon source gas flowing across the catalyst film; (d) focusing a laser beam on the catalyst film to locally heat the catalyst to a predetermined reaction temperature; and (e) growing an array of the carbon nanotubes from the substrate.

15 Claims, 2 Drawing Sheets

(56) References Cited

U.S. PATENT DOCUMENTS

| | | | |
|---|---|---|---|
| 7,771,698 | B2 | 8/2010 | Chen et al. |
| 7,780,940 | B2 | 8/2010 | Chen et al. |
| 7,820,133 | B2 | 10/2010 | Chen et al. |
| 2001/0003642 | A1 | 6/2001 | Chang et al. |
| 2001/0010892 | A1 | 8/2001 | Mori |
| 2002/0061362 | A1 | 5/2002 | Chiavarotti et al. |
| 2002/0081397 | A1 | 6/2002 | McGill et al. |
| 2002/0160111 | A1* | 10/2002 | Sun et al. ............ 427/248.1 |
| 2003/0130114 | A1* | 7/2003 | Hampden-Smith et al. .. 502/180 |
| 2004/0060477 | A1 | 4/2004 | Iwaki et al. |
| 2004/0209385 | A1 | 10/2004 | Liu et al. |
| 2004/0253758 | A1 | 12/2004 | Jung et al. |
| 2005/0000438 | A1 | 1/2005 | Lim et al. |
| 2005/0052127 | A1 | 3/2005 | Sakata et al. |
| 2005/0113509 | A1* | 5/2005 | Tazzia ...................... 524/556 |
| 2005/0118525 | A1 | 6/2005 | Kim et al. |
| 2006/0104890 | A1* | 5/2006 | Harutyunyan et al. .... 423/447.3 |
| 2006/0147848 | A1 | 7/2006 | Han et al. |
| 2006/0238095 | A1 | 10/2006 | Nam |
| 2006/0263524 | A1 | 11/2006 | Jiang et al. |
| 2008/0233402 | A1* | 9/2008 | Carlson et al. .............. 428/408 |
| 2008/0268739 | A1 | 10/2008 | Chen et al. |

OTHER PUBLICATIONS

Gutierrez et al., "Short Communication: Maximizing Light Absorption at the Bottom of a Film", Polymer Photochemistry 7 (1986) 517-521.

Kinghong Kwok, Wilson K.S. Chiu. "Growth of carbon nanotubes by open-air laser-induced chemical vapor deposition". Carbon, 2005, vol. 43, p. 437-446.

* cited by examiner

LASER-BASED METHOD FOR GROWING AN ARRAY OF CARBON NANOTUBES

RELATED APPLICATIONS

This application is related to commonly-assigned applications entitled, "LASER-BASED METHOD FOR MAKING FIELD EMISSION CATHODE", filed on Nov. 2, 2007, with application Ser. No. 11/982,674; "LASER-BASED METHOD FOR MAKING FIELD EMISSION CATHODE", filed on Nov. 2, 2007, with application Ser. No. 11/982,486; "METHOD FOR MAKING AN ARRAY OF CARBON NANOTUBES", filed on Nov. 2, 2007, with application Ser. No. 11/982,517; "METHOD FOR MAKING AN ARRAY OF CARBON NANOTUBES", filed on Nov. 2, 2007, with application Ser. No. 11/982,667; "METHOD FOR MAKING AN ARRAY OF CARBON NANOTUBES", filed on Nov. 2, 2007, with application Ser. No. 11/982,669; and "METHOD FOR MAKING AN ARRAY OF CARBON NANOTUBES", filed on Nov. 2, 2007, with application Ser. No. 11/982,489. Disclosures of the above-identified applications are incorporated herein by reference.

BACKGROUND

1. Field of the Invention

The invention relates generally to methods for growing carbon nanotubes and, particularly, to a laser-based method for growing an array of carbon nanotubes.

2. Discussion of Related Art

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). CNTs are electrically conductive along their length, chemically stable, and capable, individually, of having a very small diameter (much less than 100 nanometers) and large aspect ratios (length/diameter). Due to these and other properties, it has been suggested that CNTs can play an important role in various fields, such as microscopic electronics, field emission devices, thermal interface materials, etc.

Generally, there are three conventional methods for manufacturing CNTs. The first method is the arc discharge method, which was first discovered and reported in an article by Sumio Iijima entitled "Helical Microtubules of Graphitic Carbon" (Nature, Vol. 354, Nov. 7, 1991, pp. 56-58). The second method is the laser ablation method, which was reported in an article, by T. W. Ebbesen et al., entitled "Large-scale Synthesis of Carbon Nanotubes" (Nature, Vol. 358, 1992, pp. 220). The third method is the chemical vapor deposition (CVD) method, which was reported in an article by W. Z. Li entitled "Large-scale Synthesis of Aligned Carbon Nanotubes" (Science, Vol. 274, 1996, pp. 1701). The CVD method is advantageously useful in synthesis of an array of carbon nanotubes and is beneficial in mass production, improved length controllability, compatibility with conventional integrated circuit process, etc.

Generally, mainly three CVD methods, i.e. the thermal CVD, plasma-enhanced CVD, and laser-induced CVD, have been developed for the synthesis of arrays of carbon nanotubes. In conventional laser-induced CVD method, an opaque substrate, such as silicon, is disposed with a catalyst in a closed reactor filled with reactant gases, and either an argon ion laser or $CO_2$ laser is employed to directly irradiate laser light on the substrate to heat the substrate to a reaction temperature. By locally laser-heating the substrate, carbon nanotubes can be synthesized on the substrate.

However, the above-described laser-assisted CVD method is performed in a closed reactor filled with reactant gases. Thus, the above-described method required a complicated reaction device, and it is difficult to build and/or maintain a huge reactor device for CVD growth of carbon nanotubes on large area substrate. Moreover, the newly grown carbon nanotubes tend to directly experience an intense laser field, which can potentially damage the newly grown carbon nanotubes. Thus, the morphology of the obtained carbon nanotubes can be compromised. These carbon nanotubes typically do not sufficiently exhibit the useful properties desired in an array of carbon nanotubes.

What is needed, therefore, is a new laser-induced method for growing an array of carbon nanotubes that does not require a closed reactor system and that can avoid damaging the newly grown CNTs with an intense laser.

SUMMARY

A method for growing an array of carbon nanotubes includes the steps of: (a) providing a substrate; (b) forming a catalyst film on the substrate, the catalyst film including a carbonaceous material; (c) introducing a mixture of a carrier gas and a carbon source gas flowing across/over the catalyst film; (d) focusing a laser beam on the catalyst film to locally heat the catalyst to a predetermined temperature; and (e) growing an array of the carbon nanotubes from the substrate.

Other advantages and novel features of the present method for growing an array of carbon nanotubes will become more apparent from the following detailed description of preferred embodiments when taken in conjunction with the accompanying drawings.

BRIEF DESCRIPTION OF THE DRAWINGS

Many aspects of the present method for growing/producing an array of carbon nanotubes can be better understood with reference to the following drawings. The components in the drawings are not necessarily to scale, the emphasis instead being placed upon clearly illustrating the principles of the present method for growing/producing an array of carbon nanotubes.

Figure 1:
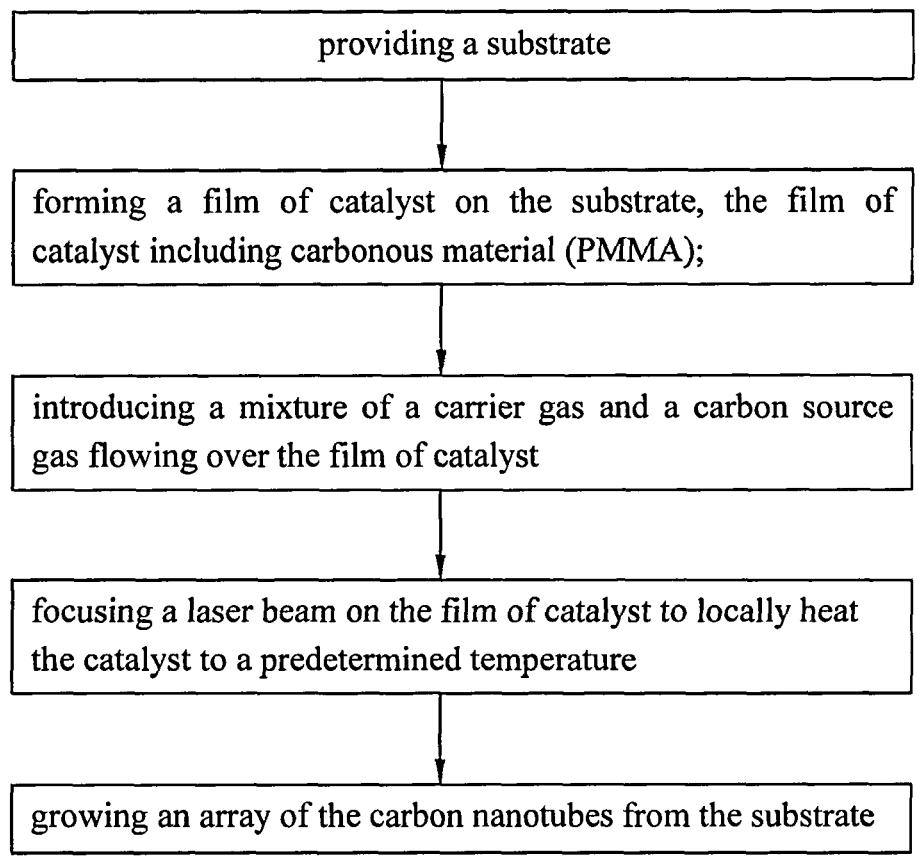
FIG. 1 is a flow chart of a method for growing an array of carbon nanotubes, in accordance with a present embodiment.

Corresponding reference characters indicate corresponding parts throughout the several views. The exemplifications set out herein illustrate at least one preferred embodiment of the present method for growing an array of carbon nanotubes, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present method for growing an array of carbon nanotubes.

Referring to FIG. 1, a method for growing/producing an array of carbon nanotubes includes the following steps: (a) providing a substrate; (b) forming a catalyst film on the substrate, the catalyst film including a carbonaceous material (i.e., a carbon-carrying catalyst film); (c) flowing a mixture of a carrier gas and a carbon source gas across/adjacent the catalyst film; (d) focusing a laser beam on the catalyst film to locally heat the catalyst film to a predetermined temperature; and (e) growing an array of the carbon nanotubes from the substrate via the catalyst film.

In step (a), the substrate is, advantageously, made of a heat-resistant material (e.g., high-melting point, chemically durable), which can tolerate the high reaction temperature (e.g., upwards of about 600° C.). It is to be understood that depending on different applications, the material of the substrate could be selected, e.g., from a group consisting of silicon; silicon dioxide and a metal for semiconductor electronical devices; and/or glass for flat displays.

Step (b) includes the steps of: (b1) providing a mixture of a dispersant and a carbonaceous material; (b2) mixing/combining the mixture with a solvent to form a solution; (b3) ultrasonically agitating the solution to promote dispersing of the carbonaceous material therein; (b4) adding a soluble catalyst material into the dispersed solution to form a catalyst solution; (b5) coating the catalyst solution on a surface of the substrate; and (b5) baking the substrate and form thereon a catalyst film including the carbonaceous material (i.e., a carbon-carrying catalyst film).

In step (b1), the carbonaceous material can usefully be selected from carbon black (CB) and/or graphite. The dispersant is used for uniformly dispersing the carbonaceous material. Quite suitably, the dispersant is sodium dodecyl benzene sulfonate (SDBS). A weight ratio of the dispersant to the carbonaceous material is, advantageously, in the approximate range from 1:2 to 1:10. In step (b2), the solvent is, opportunely, water or ethanol. In one useful embodiment, SDBS of greater than about 0~100 mg (beneficially, a measurable amount of dispersant (i.e., above about 0 mg) is employed) to and CB of about 100~500 mg can be mixed into ethanol of about 10~100 ml to form the solution. Quite usefully, the solution is formed by mixing SDBS of about 50 mg and CB of about 150 mg into ethanol of about 40 ml.

In step (b3), the solution can be sonicated (i.e., subjected to ultrasound) for, e.g., about 5 to 30 minutes to uniformly disperse the carbonaceous material in the solution. In step (b4), the soluble catalyst material can, rather appropriately, include one or more metallic nitrate compounds selected from a group consisting of magnesium nitrate ($Mg(NO_3)_2 \cdot 6H_2O$), iron nitrate ($Fe(NO_3)_3 \cdot 9H_2O$), cobalt nitrate ($Co(NO_3)_2 \cdot 6H_2O$), nickel nitrate ($Ni(NO_3)_2 \cdot 6H_2O$), and any combination thereof. In one useful embodiment, after being treated with ultrasound for about 5 minutes, $Fe(NO_3)_3 \cdot 9H_2O$ and $Mg(NO_3)_2 \cdot 6H_2O$ is added to the solution, thereby forming the catalyst solution. Quite usefully, the catalyst solution includes about 0.01~0.5 Mol/L magnesium nitrate and about 0.01~0.5 Mol/L iron nitrate.

In step (b5), the catalyst solution is, beneficially, spin coated on the substrate at a rotational speed of about 1000~5000 rpm. Quite suitably, the rotational speed for spin coating is about 1500 rpm. In step (b6), the substrate with the catalyst solution coated thereon is baked at about 60~100° C. for about 10 min to 1 hour. It is to be understood that the baking process is used to vaporize the solvent in the solution and accordingly form the carbon-carrying catalyst film on the substrate.

In step (c), a carbon source gas, which is mixed with a carrier gas, is flowing over/across the catalyst film for growing carbon nanotubes. In one useful embodiment, the carbon source gas and the carrier gas are directly introduced, in open air, by a nozzle to an area adjacent to the catalyst film. That is, the method can be operated without a closed reactor and/or without being under a vacuum. The carrier gas can, beneficially, be nitrogen ($N_2$) or a noble gas. The carbon source gas can, advantageously, be ethylene ($C_2H_4$), methane ($CH_4$), acetylene ($C_2H_2$), ethane ($C_2H_6$), or any combination thereof. Quite suitably, the carrier gas is argon (Ar), and the carbon source gas is acetylene. A ratio of the carrier gas flow-rate to the carbon source gas flow-rate is, opportunely, adjusted to be in an approximate range from 5:1 to 10:1. Quite usefully, the argon flow-rate is 200 sccm (Standard Cubic Centimeter per Minute), and the acetylene flow-rate is 25 sccm.

In step (d), the laser beam can be generated by a laser beam generator (e.g., a carbon dioxide laser, an argon ion laser, etc.). A power of the laser beam generator is in the approximate range from above about 0 W (Watt) (i.e., a measurable amount of power) to ~5 W. Quite usefully, a carbon dioxide laser of 470 mW is used for generating the laser beam. The laser beam generator further includes a lens for focusing laser beams generated by the laser beam generator. It is to be understood that the focused laser beam could be employed to directly irradiate on the catalyst film to heat the catalyst to a predetermined temperature along a direction vertical or oblique to the substrate. That is, the method can be operated in open air without heating the entire substrate to meet a reaction temperature for synthesizing carbon nanotubes.

In step (e), due to catalyzing by the catalyst film, the carbon source gas supplied through the catalyst film is pyrolyzed in a gas phase into carbon units ($C=C$ or $C$) and free hydrogen ($H_2$). The carbon units are absorbed on a free surface of the catalyst film and diffused thereinto. When the catalyst film becomes supersaturated with the dissolved carbon units, carbon nanotube growth is initiated. As the intrusion of the carbon units into the catalyst film continues, an array of carbon nanotubes is formed. The additional hydrogen produced by the pyrolyzed reaction can reduce the oxide of the catalyst and thus activate the catalyst. As such, the growth speed of the carbon nanotubes is increased, and the achievable height of the array of the carbon nanotubes is enhanced.

It is noted that the carbonaceous material in the catalyst film employed in the method has the following virtues. Firstly, the carbonaceous material will absorb laser light and thus facilitate heating of the catalyst to enable carbon nanotube growth. Secondly, the carbonaceous material will attenuate the laser field and avoid damaging the newly grown carbon nanotubes with the otherwise intense laser. Additionally, the carbonaceous material will release carbon atoms to promote the nucleation of carbon nanotubes, when irradiated by laser beam. Finally, because of the initial presence of the carbon in the catalyst film, the supersaturation point for carbon therein will be reached sooner, permitting carbon nanotube growth to start sooner than might otherwise be possible. As such, the predetermined temperature for locally heating the catalyst film by laser beam can be less than ~600° C.

Figure 2:
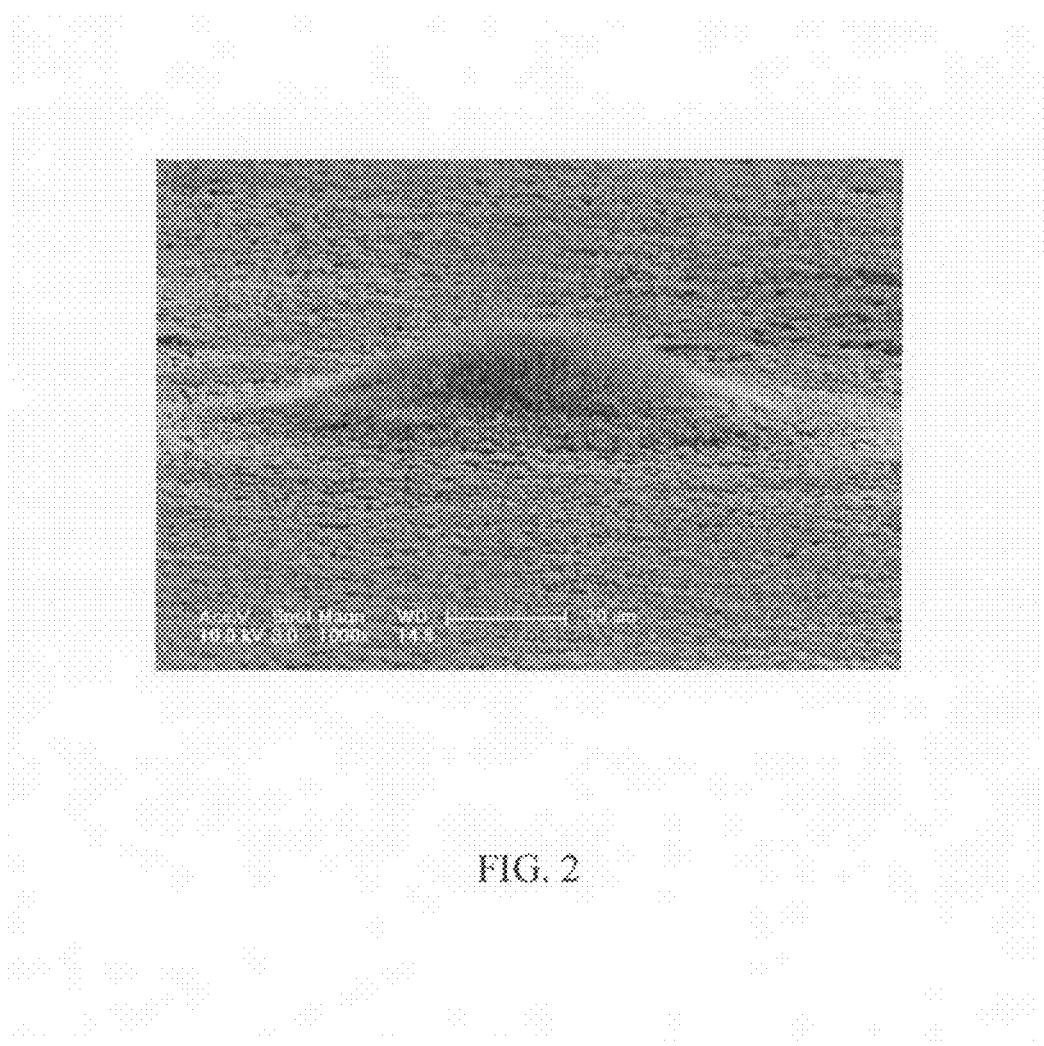
FIG. 2 shows a Scanning Electron Microscope (SEM) image of the array of carbon nanotubes formed/grown by the method of FIG. 1.

Referring to FIG. 2, an array of carbon nanotubes manufactured by the present method is shown. The array of carbon nanotubes is synthesized by irradiating the focused laser beam on the catalyst film for about 5 seconds. A diameter of the focused laser beam is in the approximate range from 50 to 200 micrometers. The formed array of carbon nanotube, in this example, manifests a hill-shaped morphology. The diameter of the hill is in the approximate range from 50 to 80 micrometers. The maximum height of the hill is in the approximate range from 10 to 20 micrometers. The diameter of each of carbon nanotubes is in the approximate range from 40 to 80 nanometers.

It is noted that, the present method can synthesize a large area array of carbon nanotubes by scanning the laser beam on a large area substrate and that the properties of carbon nanotubes thus produced are able to be closely controlled and thereby be essentially uniform.

Compared with conventional CVD methods for growing carbon nanotube arrays, the methods in the described present embodiments employ a catalyst film including a carbonaceous material thereby having the following virtues. Firstly, the carbonaceous material is able to absorb laser light and thereby heat up the catalyst to enable carbon nanotube growth. Secondly, the carbonaceous material will attenuate the laser field and help avoid potential laser damage of the newly grown carbon nanotubes. Further, the carbonaceous material will release carbon atoms to promote the nucleation of carbon nanotubes, when irradiated by laser beam. As such, the present method can be used at a relatively low temperature, for example, less than 600° C. Moreover, the present method for growing arrays of carbon nanotubes can proceed in open air without a closed reactor and/or vacuum conditions. Furthermore, the present method can synthesize large area arrays of carbon nanotubes by scanning the laser beam on the catalyst. That is, the operation and cost of the present method is relatively simple and low compared to conventional methods.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A method for growing an array of carbon nanotubes, comprising:
   (a) providing a substrate;
   (b) forming a catalyst film on the substrate, the catalyst film comprising graphite;
   (c) flowing a mixture of a carrier gas and a carbon source gas over the catalyst film in open air;
   (d) focusing a laser beam on the catalyst film to locally heat the catalyst film to a predetermined temperature; and
   (e) growing an array of the carbon nanotubes from the substrate.

2. The method as claimed in claim 1, wherein step (b) further comprises:
   (b1) providing a mixture of a dispersant and a graphite;
   (b2) combining the mixture with a solvent to form a solution;
   (b3) ultrasonically agitating the solution to promote dispersing of the graphite therein;
   (b4) adding a soluble catalyst material into the dispersed solution to form a catalyst solution;
   (b5) coating the catalyst solution on a surface of the substrate; and
   (b6) baking the substrate.

3. The method as claimed in claim 2, wherein the dispersant comprises sodium dodecyl benzene sulfonate.

4. The method as claimed in claim 2, wherein in step (b1), a weight ratio of the dispersant to the graphite is in a range from about 1:2 to about 1:10.

5. The method as claimed in claim 2, wherein in step (b4), the soluble catalyst material comprises a mixture of magnesium nitrate and a material selected from the group consisting of iron nitrate, cobalt nitrate, and nickel nitrate.

6. The method as claimed in claim 2, wherein the solvent comprises at least one of water and ethanol.

7. The method as claimed in claim 2, wherein a power of the laser beam generator is in a range from about 0 Watt to about 5 Watts.

8. The method as claimed in claim 1, wherein a thickness of the catalyst film is in a range from about 10 to about 100 micrometers.

9. The method as claimed in claim 1, wherein the carbon source gas is selected from the group consisting of ethylene, methane, acetylene, and ethane.

10. The method as claimed in claim 1, wherein the carrier gas comprises at least one of nitrogen gas and noble gas.

11. The method as claimed in claim 1, wherein a ratio of a carrier gas flow-rate to a carbon source gas flow-rate is in a range from about 5:1 to about 10:1.

12. The method as claimed in claim 1, wherein in step (d), the laser beam is generated by a laser generator selected from one of a carbon dioxide laser and an argon ion laser.

13. The method as claimed in claim 12, wherein the laser generator further comprises a lens for focusing the laser beam.

14. The method as claimed in claim 13, wherein a diameter of the laser is focused to a range from about 50 to about 200 micrometers.

15. A method for growing an array of carbon nanotubes, comprising:
   (a) providing a substrate;
   (b) forming a catalyst film comprising a graphite on the substrate by substeps of:
      (b1) providing a mixture of a dispersant and graphite, and a weight ratio of the dispersant to the graphite is in a range from about 1:2 to about 1:10;
      (b2) combining the mixture with a solvent to form a solution;
      (b3) dispersing the graphite in the solution;
      (b4) forming a catalyst solution by adding a soluble catalyst material into the solution which has been dispersed;
      (b5) coating the catalyst solution on a surface of the substrate; and
      (b6) baking the substrate;
   (c) flowing a mixture of a carrier gas and a carbon source gas over the catalyst film;
   (d) focusing a laser beam on the catalyst film to locally heat the catalyst film to a predetermined temperature; and
   (e) growing the carbon nanotubes from the substrate.

* * * * *